United States Patent [19]

Cowx et al.

[11] 4,231,912
[45] Nov. 4, 1980

[54] RUBBER LATEX COMPOUNDS

[76] Inventors: Henry Cowx, 67, Redlonning Rd., Hensingham, Whitehaven, Cumbria, England; Jean-Luc Urbain, Salmagne, 55000 Bar le Duc (Meuse), France

[21] Appl. No.: 16,406

[22] Filed: Mar. 1, 1979

[52] U.S. Cl. .............................. 260/29.7 SQ; 260/723; 260/739; 521/65; 521/89

[51] Int. Cl.$^2$ ................................................ C08J 9/30

[58] Field of Search ............... 260/29.7 SQ, 739, 723, 260/458; 521/71

[56] References Cited

U.S. PATENT DOCUMENTS

| 2,445,740 | 7/1948 | Davis | 260/739 |
| 3,795,647 | 3/1974 | Ripley-Duggan | 260/29.7 SQ |
| 3,968,285 | 7/1976 | Coffin et al. | 521/71 |

*Primary Examiner*—Morton Foelak
*Attorney, Agent, or Firm*—Frishauf, Holtz, Goodman & Woodward

[57] ABSTRACT

Novel rubber latex compounds comprise an aqueous dispersion of a natural or synthetic rubber latex and as a foaming agent an alkyl alkoxy sulphosuccinamate of the formula:

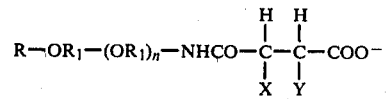

wherein R represents an alkyl group having from 7 to 18 carbon atoms, one of X and Y represents a hydrogen atom and the other represents a $SO_3$ group, n is an integer having a value of from 0 to 5 and $R_1$ represents an alkylene group comprising 2 or 3 carbon atoms. These foaming agents combine the virtues of acceptable foaming properties with relatively high solubility in aqueous solution. They can be prepared and transported as aqueous concentrates containing up to 45% of solids material.

Those compounds wherein $R_1$ represents a branched chain alkyl group are believed to be novel and are claimed as such.

10 Claims, No Drawings

RUBBER LATEX COMPOUNDS

This invention relates to the manufacture of rubber latex foams. These latices are aqueous dispersions of natural or synthetic materials and the foams are applied for example to the back surface of carpets to improve the appearance thereof and to give weight and a more luxurious tread to the carpet. The latex dispersion is formulated with a chemical foaming agent (amongst other ingredients) in order that a foam can be produced which comprises a large quantity of entrapped air evenly distributed through the latex.

The choice of foaming agent which is added to the latex is critical in that it must be able to provide optimum frothing power in order to entrap a large volume of air and provide a foam which is stable and does not collapse before it can be cured.

One class of compounds which have been used as the foaming agent for rubber latices are sulphosuccinamates having the formula:

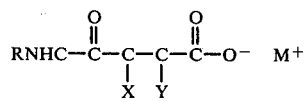

wherein R represents an aliphatic group comprising from 8 to 22 carbon atoms one of the groups X and Y represents a hydrogen atom and the other represents a hydrogen atom and the other represents a group $SO_3^-$ and $M^+$ represents an alkali metal, alkaline earth metal or ammonium cation.

They are conveniently manufactured by the reaction of an amine $RNH_2$ with maleic anhydride and subsequently with a sulphite which reactions proceed substantially according to the equations:

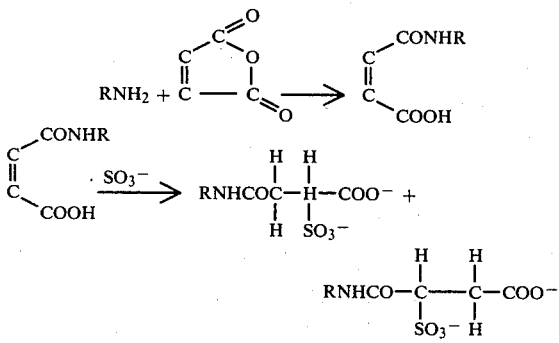

The hydrophobic group R can be any aliphatic group having an average of from 8 to 22 carbon atoms. The amines $RNH_2$ which have been employed as the feedstock are derived from synthetic or natural sources. The vast majority of the sulphosuccinamate surfactants previously available have been derived from natural sources and have comprised groups R which contain from 10 to 18 carbon atoms such as lauryl, myristyl, cetyl, stearyl, oleyl or cocoyl groups; the carbon atoms in the R group being arranged in a straight chain.

These compounds give an adequate performance as latex foaming agents. They are sufficiently good foaming agents to be used in the so-called no-gel foaming systems, i.e. those in which the stability of the foamed latex is sufficiently good that it does not collapse before drying and curing can take place. In contrast the so-called gel systems are those on which the wet latex foam is relatively unstable and requires the addition of a gelling agent to improve that stability. However these sulphosuccinamates used in the no gel systems suffer from the disadvantage that they are relatively insoluble in aqueous media. As is the case with other surface active materials it is desirable to prepare transport and use them in the form of a concentrated solution which is stable to physical change even upon porlonged storage. The alkyl sulphosuccinamates which have been derived from natural amines can only be prepared as solutions comprising up to 35 or 40% by weight of solids material and even at these concentrations they suffer from a tendency to deposit active material as a sediment or even to gel upon prolonged storage. Careful selection of the length and distribution of the alkyl chain in the amine feedstock can alleviate this problem since in general shorter chains or alkenyl amines lead to sulphosuccinamates having marginally improved solubility properties but this improvement does not completely overcome the solubility problems particularly sedimentation on prolonged storage. Sulphosuccinamates which are derived from synthetically produced amine feedstocks which amine comprise alkyl groups having a branched carbon chain exhibit improved solubility characteristics. West German Patent Application No. 2657581 describes sulphosuccinamates wherein 50% of the alkyl chains were 2 methyl branched.

We have now discovered a particular class of sulphosuccinamates which exhibit improved solubility characteristics and give acceptable performance as latex foaming agents. This class comprises compounds of the formula

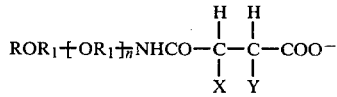

wherein n is an integer having a value of from 0 to 5; one of the groups X and Y represents a hydrogen atom, whilst the other represents a $SO_3$ group, $R_1$ represents an alkylene group having 2 or 3 carbon atoms and R represents an alkyl or alkaryl group having from 7 to 18 carbon atoms.

These sulphosuccinamates may be used as foaming agents in the production of latex foams from rubber latices especially natural latices, non-carboxylated styrene-butadiene latices or mixtures of the two. Rubber latices are conventionally sold as aqueous dispersions comprising from 50 to 65 or 70% by weight of solid material. These dispersions are formulated into a latex compound which further comprises the foaming agent.

Latex compounds comprising from 1 to 10 phr preferably from 3 to 8 phr of a sulphosuccinamate as hereinbefore defined form one aspect of our invention. (phr is parts by weight of solid matter per 100 parts by weight of rubber solids in the latex dispersion.)

The latex compound is frothed with air so as to produce a foam having the desired density. This is conveniently achieved by the continuous controlled introduction of the latex compound and air into a continuous mechanical foaming machine. The foam thus produced is spread onto the substrate dried and cured.

In conventional manufacturing procedures for latex backed carpets the foam is applied to the back of a continuous belt of carpet the thickness of the foam being regulated by a doctor knife. The carpet is passed under a bank of infra-red heaters so as to form a skin on the surface of the foam and through a long oven to simultaneously cure and dry the foam. Foam backed substrates which have been produced by treating with a foamed latex compound as hereinbefore defined, drying and curing the foam form a further aspect of our invention.

The latex compound will normally further comprise other ingredients such as a curing agent for the latex e.g. sulphur and sulphur donating compound such as zinc dithio-carbamate or zinc mercaptobenzothiozole; zinc oxide; a filler e.g. calcium carbonate; and an antioxidant. Optionally a dispersant e.g. polyphosphate and a thickener e.g. a polyacrylate or methyl-cellulose may be added to the latex compound as necessary. The sulphosuccinate foaming agent may be replaced in part say up to 40% by weight of an auxiliary foaming agent for example an alkyl sulphate, an alkyl ether sulphate or an amine oxide.

The amounts of these ingredients which are employed is dependent upon the precise nature of the latex compound and on the desired properties of the particular foam.

The preferred sulphosuccinamates for present use are those wherein n has a value of from 0 to 3, most preferably a value of 0 to 1. Compounds which comprise a mixture of species wherein n take different values but where the average value of n falls within the range defined above also form part of our invention.

The group $R_1$ may represent an ethylene —CH$_2$—CH$_2$— propylene —CH$_2$—CH$_2$—CH$_2$— or

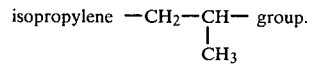

Most preferred sulphosuccinamates for use according to our invention are those wherein $R_1$ represents a propylene or isopropylene group i.e. those which can be regarded as alkyl (polypropoxy) sulpho-succinamates.

The alkyl chain R preferably comprises from 8 to 18 e.g. from 8 to 14 and most preferably from 11 to 14 carbon atoms. The carbon atoms may be arranged in straight or in branched chains or may comprise a mixture of species having branched and straight chains.

The sulphosuccinamates may be prepared in the acid form or in the form of a salt of that acid. For convenience they are normally prepared in the form of their sodium salts.

Those compounds wherein R represents a branched chain alkyl group are believed to be novel. Accordingly, from a further aspect our invention provides compounds of the formula:

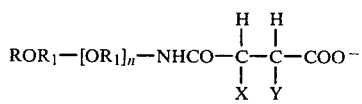

wherein n is an integer having a value of from 0 to 5, $R_1$ represents an alkylene group comprising two or three carbon atoms, one of the groups X and Y represents a hydrogen atom and the other represents a $SO_3^-$ group and R represents an alkyl or alkaryl group having from 7 to 18 carbon atoms wherein the alphatic carbon chain is branched at at least one point.

These sulphosuccinamates and those other sulphosuccinamates may be derived from primary alkyl alkoxy amines using conventional techniques of synthetic organic chemistry and in particular the route outlined above.

The amines which are used as the feedstock in the manufacture of alkyl alkoxy sulphosuccinamates may in turn be derived from alcohols having the formula ROH which may be natural or synthetic products. These may be converted to the desired amines using the techniques described in U.S. Pat. Nos. 2,371,892 and 2,372,624 by reaction with acrylonitrile followed by by hydrogenation; the reaction proceeding according to the equations:

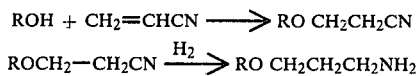

Alternatively the alcohol may be condensed with an alkylene oxide followed by ammonolysis of the resulting compound according to the equations (for ethylene oxide):

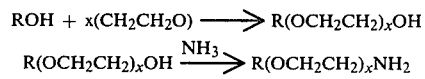

These alkyl alkoxy amines may then be reacted with maleic anhydride using conventional techniques e.g. by the addition of a substantially equimolar quantity of the amine to molten maleic anhydride at temperatures in the range 60° to 110° C. which temperatures are maintained for a period of ½ to 1½ hours. The maleamide intermediate may then be added to an aqueous solution of an alkali metal alkaline earth metal or ammonium sulphite or sulphurous acid and the reaction mixture maintained at a temperature of from 40° to 100° C. for a period of 1 to 5 hours. Even where the reaction period is prolonged the product solution of sulphosuccinamate whether in the form of an acid or its salt will be contaminated by unreacted amine and reaction by-products. The product is preferably prepared in the form of its alkali metal and especially its sodium salt.

These solutions of the sodium salts of the sulphosuccinamates which are useful in our invention may be formulated as compositions comprising up to 45% by weight of solid material. They will preferably be prepared and sold as solutions comprising from 35 to 45% by weight of solid material. The invention is illustrated by the following examples of which examples 1 to 4 illustrate the preparation of sulphosuccinamates useful according to the invention.

EXAMPLE 1

265 gms (1 gm mole) of a synthetic primary amine believed to have the formula ROCH$_2$CH$_2$CH$_2$NH$_2$ were added with stirring to 98 g (1 g mole) of maleic anhydride at a temperature of 80° to 90° C. The amine used was obtained from Messrs Hoechst A. G. under the nomenclature HOES 2504/2 wherein R is believed to be a mixture of alkyl groups containing 11 to 15 carbon atoms, the alkyl groups being an approximately 50/50 mixture of straight and branched chains. The maleamide was stirred at this temperature for a further 30 minutes.

The molten maleamide product was slowly added with stirring to a solution of 130 g (1.03 g moles) of anhydrous sodium sulphite in 700 g of water at a temperature of 50° to 75° C. The resulting solution was maintained at a temperature of 70° to 75° C. with stirring for a further three hours. The resultant clear solution containing 40% as solid material of a disodium alkyl sulphosuccinamate and of viscosity 44.9 centistrokes at 20° C. remained a clear solution even after storage at 0° C. for a period of six months. In contrast a 35% solids solution of disodium alkyl sulphosuccinamate prepared from a synthetic primary amine, $RNH_2$, where R represents an aliphatic group having from 13 to 15 carbon atoms, approximately 50% of the groups containing branching, precipitated a small quantity of insoluble matter under the same storage conditions.

At concentrations above 45% solids this alkyl alkoxy sulphosuccinamate formed a gel at 20° C.

EXAMPLE 2

136 g (0.5 g mole) of a synthetic primary amine having the formula $RO\ CH_2CH_2CH_2NH_2$ were added to with stirring to 53.9 g (0.55 g mole) of maleic anhydride at a temperature of 60° to 70° C. The maleamide reaction product was stirred for a further hour at this temperature.

The alkyl alkoxy amine used in the preparation was obtained from Humko Products Limited under the nomenclature Kemamine AP860 wherein we believe R is a mixture comprising 12 and 14 carbon atoms in the alkyl chain. The carbon atoms in R are arranged in straight chains.

The molten maleamide reaction product was slowly added with stirring to a solution of 69.3 g of sodium sulphite and 3.2 g of sodium hydroxide in 466 g of water at a temperature of 65° to 70° C. The reactant solution was maintained at this temperature for approximately 30 minutes.

The resultant clear solution containing 35% as solid material of a disodium alkyl alkoxy sulphosuccinamate remained a clear solution on storage at 20° C. but did tend to shed a very small quantity of insoluble matter on storage at 0° C. The viscosity of this 35% solution at 20° C. was 16.0 centistokes at 20° C.

In contrast a 35% solution of disodium alkyl sulphosuccinamate prepared from a synthetic primary amine, $RNH_2$, wherein R represents an aliphatic group having from 15 to 17 carbon atoms, approximately 50% of the groups containing branched chains precipitated a substantial quantity of insoluble matter on storage at 0° C. during the same period of time.

EXAMPLE 3

136 g (0.5 mole) of a synthetic primary amine having a formula $ROCH_2CH_2CH_2NH_2$ were added with stirring to 53.9 g (0.55 g mole) of maleic anhydride at a temperature of 60° to 70° C. The maleamide reaction product was stirred for a further hour at this temperature.

The alkyl alkoxy amine used in this preparation was obtained from Humko Products Limited under the nomenclature Kemamine AP860D (a purer amine derived by distillation of Kemamine AP860) wherein we believe R is a mixture comprising 12 and 14 carbon atoms in the alkyl chain. The carbon atoms in R are arranged in straight chains.

The molten maleamide reaction product was slowly added with stirring to a solution of 69.3 g of sodium sulphite and 3.2 g of sodium hydroxide in 466 g of water at a temperature of 65° to 70° C. The reactant solution was maintained at this temperature for approximately 30 minutes.

The resultant clear solution containing 35% of solids matter of a disodium alkyl alkoxy sulphosuccinamate, as with the product in Example 2, remains a clear solution on storage at 20° C. but did tend to shed a small quantity of insoluble matter on storage at 0° C.

The viscosity of this 35% solution at 20° C. was 15.9 centistokes.

EXAMPLE 4

Using the molar ratios and reaction conditions described in Example 2, a 40% solids solution of sodium alkyl alkoxy sulphosuccinamate was prepared from an alkyl alkoxy amine $ROCH_2CH_2CH_2NH_2$ supplied by Messrs Hoechst A. G. under nomenclature HOE F1940D wherein the alkyl groups in R are believed to comprise highly branched alkyl chains containing 7 to 9 carbon atoms.

The viscosity of this 40% solution at 20° C. was 116 centistrokes. This solution remained a clear liquid on prolonged storage at 0° and 20° C. Solutions of the alkyl alkoxy sulphosuccinamate remained clear liquids at 20° C. at concentrations of up to 45.01%. Above this concentration solutions tended to gel.

EXAMPLE 5

Using the molar ratios and reaction conditions described in Example 2, a clear 35% solution as solids material of a sodium alkyl alkoxy sulphosuccinamate was prepared from an alkyl alkoxy amine $ROCH_2CH_2CH_2NH_2$ supplied by Messrs Humko Chemicals Limited under the nomenclature Kemamine AP990 wherein we believe the alkyl groups in R are composed of highly branched alkyl chains containing 9 to 13 carbon atoms.

The viscosity of this clear solution was 25 centistrokes at 20° C.

This solution remained a clear solution on prolonged storage at 0° C. and 20° C.

The efficiency of various sulphosuccinamates was compared by making a series of latex compounds according to the following formulation:

| *Intex 131 | 100 phr |
|---|---|
| Cure dispersion | 8 phr |
| Foaming Agent | 5 phr |
| Filler (Calmonte AD) | 150 phr |
| Calgon PT | 1 phr |

*Intex 131 is a synthetic non-carboxylated styrene-butadiene latex supplied by International Synthetic Rubber Company Limited.
phr is parts by weight of dry solids per 100 parts by weight of rubber solids in latex dispersion.

Each latex compound was foamed by beating in air using a household food mixer for 7 minutes and the density was noted. Two samples of the wet foam were spread to uniform thickness on metal plates. One sample (A) was immediately cured in an oven at 130° to 140° C. for 30 minutes. The second sample (B) was allowed to stand for 10 minutes and then cured in a similar manner. The second sample, therefore, indicates the bank stability of the wet foam.

The cured foams A and B were examined visually for uniformity of bubble structure on the surface, uniformity of bubble structure in the body of the sample and surface crazing. Marks in the range 1 to 5 were awarded for each quality higher marks representing better performance. The results are summarized in the following table:

| Example No. | Amine Feedstock for Sulphosuccinamate | Grading of A Samples | | | Grading of B Samples | | | Total | Foam Density (g/cc) |
|---|---|---|---|---|---|---|---|---|---|
| | | Surface Bubbles | Surface Cracks | Bulk Structure | Surface Bubbles | Surface Cracks | Bulk Structure | | |
| 1 | HOES 2504/2 | 5 | 3 | 4 | 5 | 3 | 4 | 24 | 0.22 |
| 2 | Kemamine AP860 | 5 | 4 | 5 | 5 | 2 | 4 | 25 | 0.20 |
| 3 | Kemamine AP860D | 5 | 4 | 5 | 5 | 2 | 5 | 26 | 0.21 |
| 4 | Hoe F1940D | 5 | 5 | 2 | 4 | 3 | 2 | 21 | 0.21 |
| 5 | Kemamine AP990 | 5 | 3 | 3 | 5 | 2 | 2 | 20 | 0.22 |
| A | Synprolam 35 | 5 | 5 | 5 | 3 | 4 | 4 | 26 | 0.19 |
| B | Naturally derived tallow amine | 5 | 4 | 5 | 5 | 3 | 3 | 25 | 0.21 |
| C | Naturally derived tallow amine | 5 | 5 | 5 | 4 | 5 | 5 | 29 | 0.23 |
| D | Primene 81R - Highly branched aliphatic group R containing 12–14C atoms | 3 | 5 | 0 | 2 | 3 | 0 | 13 | 0.29 |

Comparison of evaluations B and C shows that this technique is susceptible to experimental error.
Evaluation D shows a poor performance which was unlikely to be commercially acceptable.

What we claim is:
1. A latex compound which comprises an aqueous dispersion of a rubber latex and a sulphosuccinamate of the formula:

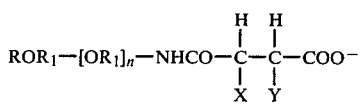

wherein R represents an alkyl or alkaryl group having from 7 to 18 carbon atoms, $R_1$ represents an alkylene group having 2 to 3 carbon atoms, n is an integer having a value of from 0 to 5 and one of the groups X and Y represents a hydrogen atom whilst the other represents a $SO_3$ group.

2. A latex compound according to claim 1, wherein the latex is a natural rubber latex, a non-carboxylated styrene-butadiene latex or a mixture of the two.

3. A latex compound according to claim 2, wherein the latex used to form the compound comprises from 50 to 70% by weight of solid material.

4. A latex compound according to claim 2, which comprises from 1 to 10 phr of the sulphosuccinamate (where phr is parts by weight of solid matter per 100 parts by weight of rubber solids in the latex).

5. A latex compound according to claim 4, which comprises from 3 to 8 phr of the sulphosuccinamate.

6. A latex compound according to claim 5, wherein the sulphosuccinamate is a compound wherein n has a value of from 0 to 3.

7. A latex compound according to claim 5, wherein $R_1$ represents a propylene or isopropylene group.

8. A latex compound according to claim 5 wherein R represents an alkyl group comprising from 8 to 18 carbon atoms.

9. A latex compound according to claim 6, wherein $R_1$ represents a propylene or isopropylene group.

10. A latex compound according to claim 9 wherein R represents an alkyl group comprising from 8 to 18 carbon atoms.

* * * * *